(12) United States Patent
Knisely et al.

(10) Patent No.: US 7,251,228 B2
(45) Date of Patent: Jul. 31, 2007

(54) METHOD FOR CELL SWITCHING IN WIRELESS COMMUNICATION SYSTEMS

(75) Inventors: Douglas N. Knisely, Wheaton, IL (US); Subramanian Vasudevan, Chatham, NJ (US); Yunsong Yan, Piscataway, NJ (US); Wenfeng Zhang, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 963 days.

(21) Appl. No.: 10/091,674

(22) Filed: Mar. 5, 2002

(65) Prior Publication Data

US 2003/0169705 A1 Sep. 11, 2003

(51) Int. Cl.
*H04Q 7/00* (2006.01)
(52) U.S. Cl. .................. 370/332; 455/437; 370/336; 370/335
(58) Field of Classification Search ............. 370/332, 370/335, 342, 354, 350, 277; 455/465.2, 455/436, 450
See application file for complete search history.

(56) References Cited

U.S. PATENT DOCUMENTS

| 5,634,192 | A | | 5/1997 | Meche et al. | |
|---|---|---|---|---|---|
| 5,781,593 | A | * | 7/1998 | Petch et al. | 375/354 |
| 5,901,358 | A | * | 5/1999 | Petty et al. | 455/456.2 |
| 6,157,668 | A | * | 12/2000 | Gilhousen et al. | 375/130 |
| 6,243,372 | B1 | * | 6/2001 | Petch et al. | 370/350 |
| 6,308,073 | B1 | * | 10/2001 | Petty et al. | 455/456.3 |
| 6,567,393 | B2 | * | 5/2003 | Hamalainen et al. | 370/342 |
| 6,621,813 | B2 | * | 9/2003 | Petch et al. | 370/350 |

(Continued)

FOREIGN PATENT DOCUMENTS

WO WO 95 26094 A 9/1995

OTHER PUBLICATIONS

"3GPP RAN S1.14 V2.0.0, UTRA FDD; physical layer procedures, Chapter 8 -Feedback mode transmit diversity-" 3GPP RAN S1.14 V2.0.0, XX, XX, Apr. 1999, pp. 1-32, XP002184716; * p. 15, paragraph 5.2.3.4—p. 18, paragraph 5.2.3.4.8 * * figure 5 *.
3GPP2: "1xEV-DV Forward Link Overview" 3GPP2, Nov. 16, 2001, XP002247591 Retrieved from the Internet: AN/TSGR_AHs/2001_11_3GPP2_HSDPA_Harmonisati> [retrieved on Jul. 14, 2003]; * p. 20-p. 21 *.

(Continued)

*Primary Examiner*—Bob A. Phunkulh

(57) ABSTRACT

A method for switching cells by a mobile equipment of a communication system. The mobile transmits a signal coded with a spreading code indicating the mobile's intent to switch cells and the coded information also identifies to which cell the mobile wants to switch. The coded information contains channel measurement adjustment information that is continuously transmitted to the cell which is currently serving the mobile. The flow of channel measurement adjustment information is therefore not disturbed by the application of the method of the present invention. Because the coded information identifies the target cell and indicates the mobile's intent to perform a cell switching procedure, the amount of processing done by the cells is significantly reduced thus increasing the likelihood of a successful switching procedure.

20 Claims, 4 Drawing Sheets

U.S. PATENT DOCUMENTS

| | | | | |
|---|---|---|---|---|
| 6,711,144 | B1 * | 3/2004 | Kim et al. | 370/335 |
| 6,816,476 | B2 * | 11/2004 | Kim et al. | 370/342 |
| 2001/0055969 | A1 * | 12/2001 | Bonta et al. | 455/436 |
| 2002/0160777 | A1 * | 10/2002 | Takao et al. | 455/436 |
| 2002/0196752 | A1 | 12/2002 | Attar et al. | |
| 2003/0206530 | A1 * | 11/2003 | Lindsay et al. | 370/277 |
| 2004/0018843 | A1 * | 1/2004 | Cerwall et al. | 455/450 |

OTHER PUBLICATIONS

"3GPP2 C.S0029-0 Version 1.0. 3GPP2 Test Application Specification (TAS) for High Rate Packet Data Air Interface. Chapter 2" 3GPP2 C.S0029-0, [Online]—May 11, 2001 p. 1,7-31 XP002265474 Retrieved from the Internet: <URL: http://www.3gpp2.org/Public_html/specs/C.S0029-0_v1.0.pdf> [retrieved on Dec. 16, 2003]; * p. 8-9, paragraph 2.6.1 *.

Ghosh A et al: "Air-Interface for 1XTREME/1XEV-DV" VTC 2001 SPRING. IEEE VTS 53RD. Vehicular Technology Conference. Rhodes, Greece, May 6-9, 2001, IEEE Vehicular Technology Conference, New York, NY: IEEE, US, vol. 4 of 4. Conf. 53, May 6, 2001, pp. 2474-2478, XP001076204 ISBN: 0-7803-6728-6 * p. 2475, left-hand column, line 27-line 46 * * p. 2476, right-hand column, paragraph 5 * * figures 7, 9 *.

* cited by examiner

METHOD FOR CELL SWITCHING IN WIRELESS COMMUNICATION SYSTEMS

BACKGROUND OF THE INVENTION

1. Field of the Invention

The present invention relates to communication systems, and more particularly, to wireless communication systems.

2. Description of the Related Art

Wireless communication systems are typically configured as cellular communication systems which comprise a plurality of cells each of which contains system equipment that is part of the wireless communication system. A cell is a geographical area with defined boundaries and contains system communication equipment such as a base station that conveys (i.e., transmits and/or receives) communication signals to and from mobile equipment. The system equipment comprise typical communication equipment such as transmitters, receivers and processors that convey communication signals within the communication system. The system equipment for a cell may be located at one or more points in the cell. Hereinafter, the terms "base station" and "system equipment" will be used interchangeably. The system equipment is usually owned, operated and controlled by a service provider or a network provider. Examples of service providers include wireless telephone companies, data network companies and other communication service entities. The mobile equipment is usually owned, operated and to a certain extent, controlled by a user of the communication system. Examples, of mobile equipment include cellular telephones, wireless personal computers, pagers and Personal Digital Assistants (PDA). The information conveyed between the mobile equipment and the system equipment comprise communication signals representing voice, video, and data information. The data information can be textual information, graphical information or any other type of information that is not time sensitive. Voice and video signals represent information that is time sensitive; that is, voice and video signals are conveyed in a continuous manner without any time gaps. When time gaps occur during the transmission of a voice or video signals, the gaps are discernible making it difficult for a user to properly interpret the information being carried by the communication signal.

As a mobile equipment migrates from cell to cell within the system, the mobile equipment, at some point, has to be handed off from one base station to another base station. The handoff procedure is a well known concept used in many different types of cellular wireless communication systems such as Code Division Multiple Access (CDMA) systems, Frequency Division Multiple Access (FDMA) systems and Time Division Multiple Access (TDMA) systems. In CDMA systems, the handoff procedure is termed soft, which implies that the mobile may be in bi-directional communication with a multiplicity of base stations for a period of time as it migrates from one cell to another. A mobile positioned to receive voice/data from and transmit voice/data to multiple base stations at the same time is said to be in soft handoff.

While in a particular cell, a mobile equipment is served by the base station of that cell; that is, information is conveyed between the mobile equipment and the base station. Information is transmitted from the base station to the mobile over a communication link commonly referred to as the forward link. Information is received by the base station from the mobile over a communication link commonly referred to as a reverse link. The forward link—as well as the reverse link—comprises different communication channels for conveying either traffic information or signaling information. Traffic information is the information being received or transmitted by the user. As previously indicated, examples of traffic information include voice, video and data. Signaling information is information generated by the system equipment and also by the mobile equipment to allow the system to control, operate and manage the flow of traffic information in the system. The signaling information is arranged, transmitted and received in accordance with a protocol. A protocol is a set of rules that dictate how signaling information is to be formatted, transmitted and received. A protocol is usually based on a standard defined by standards bodies comprising private commercial entities and/or governmental regulatory bodies.

The handoff procedure identifies particular circumstances under which the system allows a mobile equipment to be simultaneously served by more than one base station; these base stations are known as the members of the active set of base stations. For relatively high-speed data applications, it is preferable to send data to the mobile from one of these base stations designated as the serving base station for the data application. At some point in time, the migrating mobile equipment may choose to receive data from another base station (i.e., another cell) in the active set; this base station is designated as the target base station for data service. In the context of a CDMA system complying with cdma 2000 Release C standard, the mobile receives data on the Forward-Packet Data Channel (F-PDCH) from a serving base station. At some point during the cell switching procedure the serving base station stops transmission on the F-PDCH to the mobile. At approximately the same time, the target base station becomes the serving base station and resumes transmissions to the mobile on the F-PDCH. The mobile is thus said to have switched from a serving base station to a target base station completing a cell switching procedure. In other words, the mobile has switched cells or the mobile has switched from one cell to another cell. The cell switching procedure is thus performed by the mobile, the serving system equipment and the target system equipment.

During the cell switch, various parameters are received by the target base station from the mobile and from the serving base station. Also, the serving base station receives parameters from the mobile. One of the parameters received by the target base station from the mobile is the Carrier to Interference ratio (C/I) which is a measure of a pilot signal that is transmitted in a substantially continuous manner by all of the base stations in the communication system. The serving base station, the target base station as well as all of the other base stations in the system transmit a pilot signal in a substantially continuous manner over their respective forward pilot channel that is part of the forward link. The mobile equipment being served by the base stations receive the pilot signals, measure the pilot signals and transmit the measurement (in the form of Carrier to Interference ratio or C/I) to the base stations. C/I is a measure of the quality of the forward channels in the forward link. Generally speaking the higher the C/I, the better the quality of the forward channel. While a mobile is being served by a base station, the mobile transmits the C/I to the serving base station for a defined period of time followed by the transmission of channel measurement adjustment information for another defined period of time. The channel measurement adjustment information is information that instructs the base station (serving and/or target) to either increase or decrease its transmission power (i.e., the power of its transmitted signals over the forward link) so as to adequately and efficiently serve the mobile. The channel measurement adjustment information may also include any information instructing the base station to adjust one or more parameters (e.g., bandwidth, power, data speed) of a communication channel.

In many CDMA systems, the mobile transmits information to a base station during a defined time period called a frame. For some of these CDMA communication systems, the frame has a duration of 20 msec. The frame is divided into 16 equal time slots. Thus, each time slot is approximately 1.25 msec. in duration. For such systems that use 20 msec. frames, the mobile transmits the C/I information during the first time slot using 4 bits. Each of the ensuing 15 time slots of the frame are used by the mobile to transmit channel measurement adjustment information that, for example, instructs the serving base station to adjust its power, bandwidth, data speed, intervals of time allocated to the mobile on the forward link or any other controllable system parameter.

During the cell switch procedure, the migrating mobile equipment transmits the C/I of the serving base station to the serving base station. A decreasing C/I measurement is typically an indication that the mobile is moving away from the serving base station and that the serving base station has to significantly increase the power of its communication signals in order to adequately serve the mobile. The mobile is also tracking the C/I of a target base station to the target base station. Usually, when the C/I of the target base station is increasing, it is an indication that such target base station is a good candidate to adequately serve the migrating mobile. In CDMA systems that mainly convey data, the mobile can wait until the C/I of the target base station is sufficiently adequate to initiate and complete the cell switch, taking advantage of the dynamics of the system and decreasing the likelihood of loss of communication and/or an increased occurrence of errors while in handoff. One particular CDMA communication system that conveys mainly data information is a CDMA system designed to comply with the 1x-EVDV (EVolution for Data and Voice) standard.

Generally, in CDMA communication systems, and in particular, in 1x-EVDV CDMA communication systems, information transmitted and received by each mobile is coded with a code called a PN (Pseudo-Noise)code which in effect defines a particularly specific communication channel for each mobile in the system. Further, when a mobile wishes to transmit information to a specific base station, it codes the information with a spreading code called a cover code that specifically identifies that base station. Generally, the spreading code is a code which when applied to a communication signal causes the frequency spectrum of the signal to encompass a relatively wider bandwidth than the bandwidth of the signal without the applied spreading code. One type of spreading code is the well known Walsh code used in CDMA systems. Thus, information transmitted by a mobile to a particular base station is coded with a PN code identifying the mobile and with a cover code identifying the base station for which the information is destined. A cover code, which is typically a spreading code, is assigned to a base station so that information to which the cover code is applied can be received by the base station and not by other base stations. The information is carried by one or more sinusoidal signals (e.g., radio signals) which are modulated and combined in accordance with the value of the PN code and the cover code to form a specific waveform defined by those codes.

Normally, when the mobile does not wish to switch cells, it transmits C/I information of the serving base station to that base station during the first time slot of the frame using the cover code of the serving base station. The C/I information is a 4-bit quantized value of the measured C/I information of the serving base station. There are currently 8 defined cover codes 6 of which are used by CDMA communication systems that comply with the 1x-EVDV standard. The remaining two cover codes are not, at the present, used by 1x-EVDV communication systems. The mobile then transmits 1-bit update information (i.e., channel measurement adjustment information) in each of the ensuing 15 slots of the frame instructing the serving base station to either increase or decrease its transmission power by a defined amount. During this time of normal transmission, the frames being transmitted by the mobile is called a non-switch frame. For 1x-EVDV CDMA systems, the frame is contained in a radio signal (combined and modulated by the cover code and the PN code) transmitted by the mobile over a signaling channel of the reverse link called the Reverse Channel Quality Indicator (R-CQICH).

When a migrating mobile wishes to initiate cell switching it notifies its serving base station in some manner. One way in which the migrating mobile notifies the serving base station is to transmit the same C/I information of the target cell repeatedly (during, say, the first 4 consecutive time slots of the 20 msec. frame) to the serving base station and the target base station using the cover code of the target base station. Each of the remaining time slots (i.e., 12 remaining time slots) of the frame are used, as before, by the mobile to transmit channel measurement adjustment information about the serving base station. The C/I information is represented by a 4-bit block of data that is a quantized value of the measured C/I value of the forward link of the target base station. The transmission is received by both the serving and target base stations. The format of the frames as discussed above (i.e., four 4-bit C/I quantized values followed by twelve 1-bit adjustment data) describes what is called a switch frame. Therefore, during normal operation (i.e., cell switch is not desired by mobile or network equipment), non-switch frames are transmitted by the mobile over the R-CQICH signaling channel. However, when a mobile desires to switch cells, it transmits switch frames having the format described above. The transmission of switch frames by a mobile creates certain disadvantages that adversely affect the ability of the mobile to adequately and efficiently use its power resource, interrupts the flow of C/I adjustment information to the base station and also burdens the serving base station with an increased amount of processing.

Referring to FIG. 1, there is shown the format of non-switch frames and switch frames transmitted by a mobile in a cell A that is switching to cell B. The first slot of non-switch frame is shaded to indicate the a 4-bit quantized C/I information for the serving cell (i.e., cell A) is contained in such slot. The ensuing 15 slots of non-switch frame 1 contain, inter alia, 1-bit channel measurement adjustment information for the serving cell A. In the switch frame, the first four slots contain 4-bit C/I quantized information whereby information in each of the slots of the switch frame is contained in a signal coded with the cover code of the target cell B. The remaining 12 slots contain channel measurement adjustment information for serving cell A and information in each of these slots is contained in a signal coded with the cover code assigned to cell A. Note that there is an interruption in the adjustment information when the switch frame is being transmitted. Non-switch frame 2 is transmitted by the mobile when cell switching is completed meaning that cell B is now serving the mobile. The first slot of non-switch frame 2 contains 4-bit C/I quantized information the forward link of cell B. The remaining 15 slots contain 1-bit adjustment information for cell B.

The serving base station has to detect the mobile's transmission of switch frames indicating that the mobile wants to switch to a target cell having the particular cover code and thus wishes to commence a switching procedure. Information in each slot of the frames (switch and non-switch) are transmitted as one or more sinusoidal signals combined and modulated by the cover code, the 4-bit C/I quantization value and the 1-bit code used for adjustment information. The serving base station receives the switch frame from the mobile, but has to confirm that the frame is indeed a switch frame. Because the 4-bit C/I information, the cover code and the 1-bit instruction modulates the communication signal (in the form of one or more sinusoidal carrier signals) the serving base station has to examine the contents of the first four time slots of the received frame and compare the contents to waveforms containing all of the possible cover codes and quantized values excluding its own cover code, i.e., $2^4 \cdot 5$ or 80 waveforms. The serving base station also has to compare the contents of the these four slots of the received frame to all possible waveforms containing the possible quantized C/I values and all possibilities of the 1 bit codes that would be located in the ensuing three slots were the received frame a non-switch frame, i.e., $2^4 \cdot 2^3$ or 128 possible waveforms. In this manner, the serving base station confirms that, indeed, the received frame is a switching frame and not a non-switch frame. Thus, whenever a mobile transmits a switching frame to the serving base station, the serving base station has to process up to 208 waveforms (80+128) to properly detect and interpret the switching frame. The processing of 208 waveforms represents a substantial processing burden on the target base station which is already performing other processing steps for the switching mobile and other mobiles. The relatively large number of possible candidate waveforms that need to be considered by the serving base station increases the likelihood of not detecting the switch frame. Also, the mobile is forced to increase its transmit power to compensate for the unreliability of reception at the base station (due to the relatively large choice of waveforms). Further, because the first four slots of the switch frame contains C/I information of the target base station, the adjustment information that would be normally transmitted in the second, third and fourth slots are interrupted. This interruption in the flow of adjustment information to the serving base station may severely hamper the serving base station's ability to properly serve the migrating mobile during this switching phase.

SUMMARY OF THE INVENTION

The present invention provides a method of cell switching used in a switching procedure between a mobile, serving and target system equipment of a wireless communication system. During an advantageous time period selected by the mobile, the mobile generates and transmits coded information to a serving system equipment indicating the mobile's intention to switch to a cell having a target system equipment specifically identified by the coded information. Upon receipt of an acknowledgement signal by the mobile from the serving system equipment or after a defined period of time has elapsed from the time the coded information was transmitted, the mobile and the serving system equipment can be allowed to complete the switching procedure thus permitting cell switching to occur. Because the coded information transmitted by the mobile is interpreted by the network equipment as the mobile's intent to switch cells and because the coded information contains information indicating to which cell the mobile wants to switch, the amount of switch processing performed by the serving system equipment can be significantly reduced. The coded information can also contains channel measurement adjustment information typically transmitted in a substantially continuous manner by the mobile to the serving system equipment and thus the implementation of the method of the present invention does not interrupt the flow of such adjustment information from the mobile to the serving system equipment. Further, because the mobile is able to select an advantageous time period to initiate cell switching, significantly reducing the number of waveforms the serving and target base stations need to test against, the likelihood of a successful switching procedure and thus a successful cell switch can be improved significantly.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
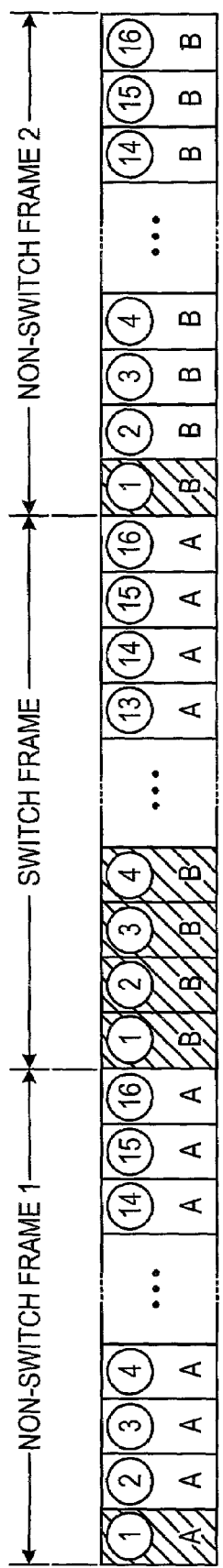
FIG. 1 depicts the format of switching and non-switching frames transmitted by a mobile intending to initiate a cell switching procedure.

The present invention provides a method of cell switching used for mobiles that are in handoff and for a switching procedure between a mobile, serving and target system equipment. The method of the present invention is applicable to both soft and hard handoffs. During an advantageous time period selected by the mobile, the mobile generates and transmits coded information to a serving system equipment indicating the mobile's intention to switch to a cell having a target system equipment specifically identified by the coded information. Upon receipt of an acknowledgement signal by the mobile from the serving system equipment or after a defined period of time has elapsed from the time the coded information was transmitted, the mobile and the serving system equipment are allowed to complete the switching procedure thus permitting cell switching to occur. The serving system equipment comprise system communication equipment serving the cell in which the mobile is currently located (i.e., the serving cell) and the target system communication equipment comprise system communication equipment in the cell to which the mobile is migrating (i.e., the target cell).

The coded information is a signal (radio signal, sinusoidal or other type of waveform) to which a code is applied where such code indicates a mobile's intention to switch cells and identifies the target cell or target system equipment. The code can be a spreading code, a cover code, a PN code or other type of code used to modulate a signal. Further, the coded information contains formatted information that can also identify the target cell or target system equipment and the formatted information contains channel measurement adjustment information for the serving system equipment. Also, the coded information may contain the formatted information that identifies a target cell and indicates a mobile's intention to switch cells while also having channel measurement information for the serving system equipment where such coded information does not have a spread code applied to it. The coded information is transmitted by the mobile.

Because the coded information transmitted by the mobile is interpreted by the network equipment as the mobile's intent to switch cells and because the coded information contains information indicating to which cell the mobile wants to switch, the amount of processing performed by the serving system equipment is significantly reduced. Also, because the coded information contains channel measurement adjustment information typically transmitted in a substantially continuous manner by the mobile to the serving system equipment, the implementation of the method of the present invention does not interrupt the flow of such update information from the mobile to the serving system equipment. Further, because the mobile is able to select an advantageous time period to initiate cell switching, the likelihood of a successful switching procedure and thus a successful cell switch is improved significantly. The advantageous time period selected by the mobile occurs when the C/I ratio (as measured by the mobile) of the communication links of the target cell is above a threshold defined by the mobile and/or communication system or when the C/I ratio (as measured by the mobile) of the communication links of the target cell is within a range specified by the mobile and/or communication system.

For clarity of discussion the method of the present invention will be discussed in the context of a 1x-EVDV CDMA wireless communication system in which a mobile indicates its intent to switch cells by transmitting coded information (having a switching frame) to its serving system equipment whereby the switching frame is 20 msec in duration and is divided into 16 equal time slots. Further, the mobile indicates which base station it is transmitting its switching frame to by coding waveforms carrying the switching frame information with a cover code assigned to the base station. Currently, there are 8 defined cover codes, only 6 of which are used by current 1x-EVDV systems. It will be readily understood by one skilled in the art to which this invention belongs that the method of the present invention is not limited to 1x-EVDV CDMA communication systems but can certainly be used in other wireless CDMA communication systems or other wireless communication systems that use coded information for indicating the intent of a mobile to switch to a target system equipment.

Figure 2:
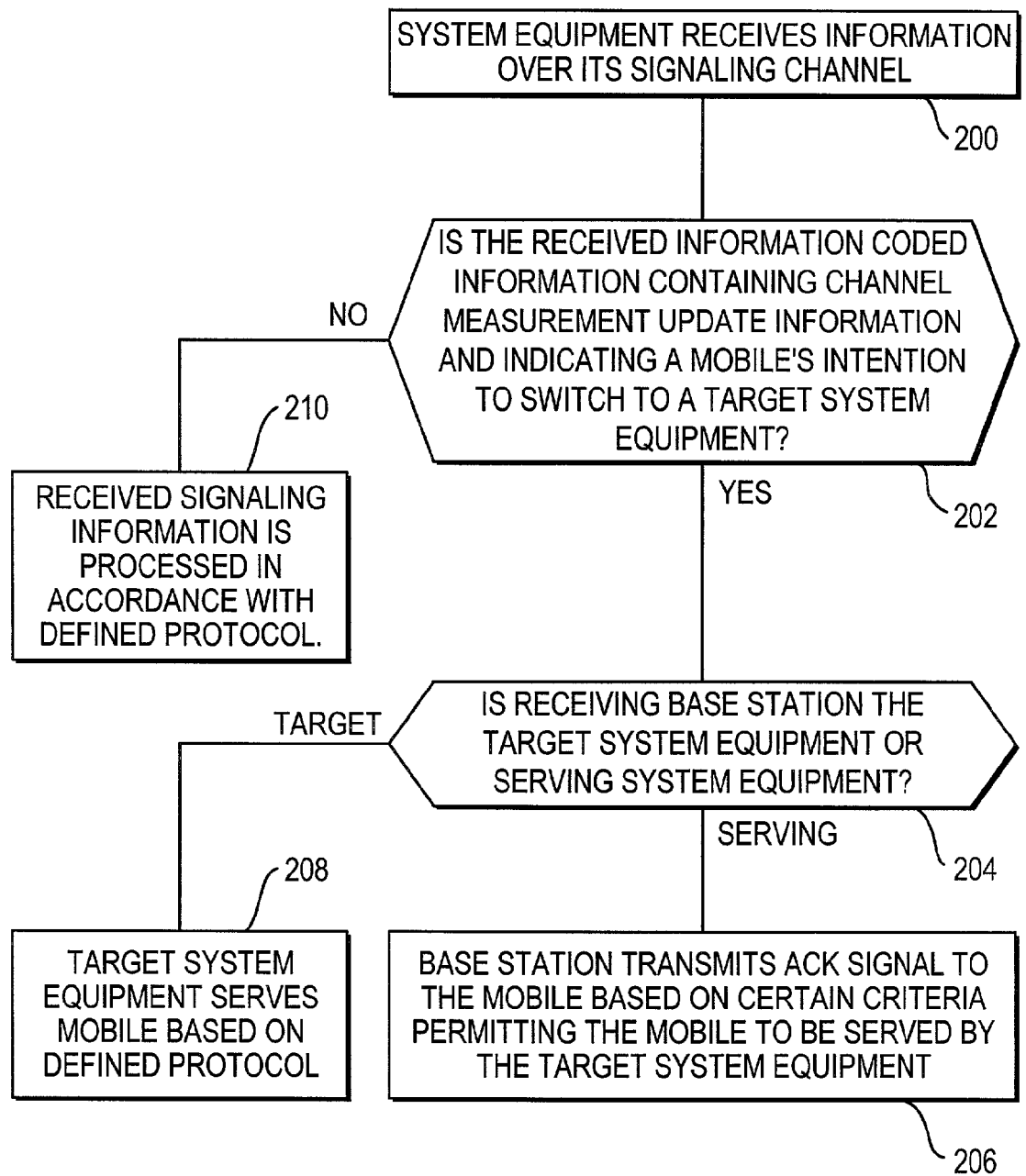
FIG. 2 depicts a flow chart of the method of the present invention as executed by system equipment of a wireless communication system.

Referring now to FIG. 2, there is shown a flow chart of the method of the present invention as executed by system equipment of a wireless CDMA communication system that complies with the 1x-EVDV standard. In step 200, a base station receives information over its signaling channel which is the R-CQICH of the reverse link of the communication system. When the received information is coded information containing a switching frame from a mobile desiring to switch cells, the switching frame is formatted as per the method of the present invention. The mobile selects an advantageous time to transmit the coded information so as to take advantage of system dynamics. For example, when the C/I ratio of the target base station is above a certain threshold or when the C/I is within a specified range (both the threshold and the specified range are defined by the communication system and/or the mobile), the mobile transmits the coded information. Further, all base stations have knowledge of the timing of the transmission of the coded information. In particular, in a first embodiment of the method of the present invention, the mobile indicates—to the base station—its desire to switch cells by coding the waveforms carrying the switching frame information with a null code. The null code is another type of spreading code that is defined by the communication system to indicate that the frame is a switching frame.

For a 1x-EVDV CDMA communication system, the null code may be one of the two remaining codes originally designated as cover codes for base stations. Other codes or newly defined codes can be used as part of a set of null codes. Thus, when any base station receives coded information that uses a null code, the base station automatically knows that the frame contained within the coded information is a switching frame and that the mobile from which the frame was transmitted wants to switch cells. The base station is able to identify the mobile because all transmissions from all mobiles of the wireless communication use PN codes uniquely identifying the mobile. Further, the frame containing the null code contains a 4-bit code in its first time slot representing the C/I measurement of the serving base station of the transmitting mobile and the following 3 slots (i.e., slots 2, 3 and 4) of the frame contain a new 4-bit code. The new 4 bit code represents the following: the first three bits identify one of 8 possible target base stations and the last bit represents channel measurement information of the base station serving the mobile. The remaining 12 slots contains 1-bit channel measurement adjustment information as before. In this manner, the null coded information not only is defined as a switching frame by a base station receiving the null coded information, but it contains information identifying the target base station and also contains channel measurement adjustment information allowing the mobile to transmit channel adjustment information to the serving base station without any interruption to such information. The application of the method of the present invention is thus transparent to a CDMA system that complies with the current 1x-EVDV standard. The null code format can thus be adopted into the 1x-EVDV standard without any major modification to the standard.

Figure 4:
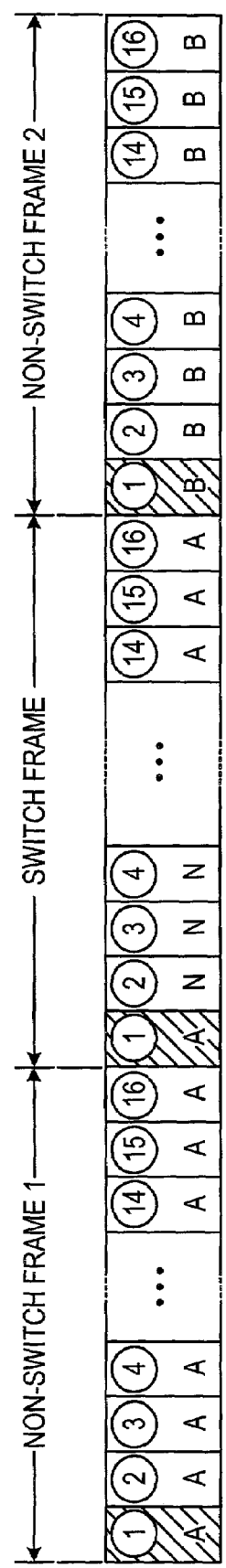
FIG. 4 depicts the format of non-switch and switch frames contained in null coded information transmitted by a mobile switching from a cell A to a cell B in accordance with the method of the present invention.

Referring to FIG. 4, there is shown the frame format of the frame contained in a null coded signal for a mobile switching from a cell A to a cell B. The first frame is non-switch frame 1 having a first slot that contains C/I quantized information with the remaining 15 slots containing 1-bit channel measurement adjustment information. All of the slots of non-switch frame 1 is coded with the cover code assigned to cell A. Slots 2, 3, and 4 of the switch frame is contained in a signal coded with a null code whereby such signal can be received and interpreted by cell A, cell B and other cells. The first slot of the switch frame contains 4-bit C/I quantized information for cell A and thus the signal carrying this information is coded with the cover code assigned to cell A. Slots 2, 3 and 4 of the switch frame contain a 4-bit information where the first three bits identify any one of six cells (i.e., base stations) and the fourth bit is used for channel measurement adjustment information.

Here, cell B is identified as the target cell. When the cell switching procedure is completed, cell B is now the serving cell where the first slot of non-switch frame 2 contains 4-bit C/I quantized information and the remaining 15 slots contain 1-bit channel measurement adjustment information. Also, each of the slot of non-switch frame 2 is contained within a signal that is coded with the cover code assigned to cell B.

Figure 5:
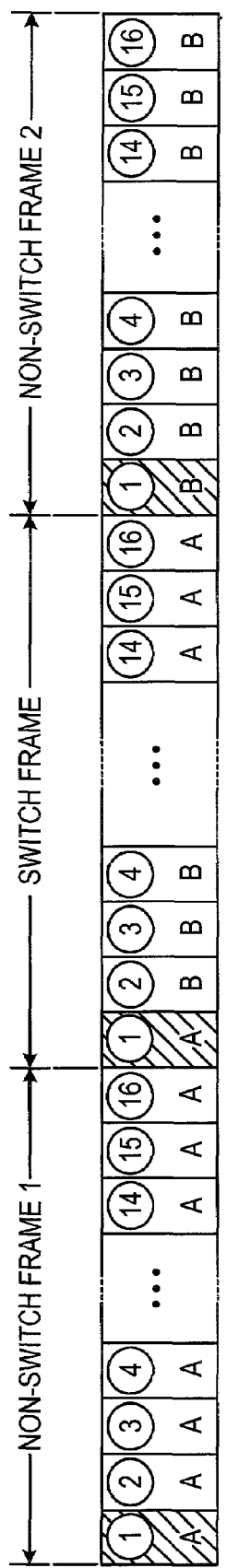
FIG. 5 depicts the format of non-switch frames and switch frames contained in a cover coded information transmitted by a mobile switching from a cell A to cell B in accordance with the method of the present invention.

Referring now to FIG. 5, there is shown another format of frames in coded information transmitted by a mobile switching from cell A to cell B. In this second embodiment, non-switch frame 1 has the same format as in non-switch frame 1 of FIG. 4. Slots 2, 3 and 4 of the switch frame, however, is contained in signals transmitted by the mobile which signals are coded with the cover code of cell B. The first slot of the switch frame contains C/I 4-bit quantized information for cell A and thus this slot is contained in a signal coded with the cover code assigned to cell A. The remaining 15 slots contain 1-bit channel measurement adjustment information for cell A. Cell B is determined to be the target cell because its cover code is used to code the transmitted signal for slots 2, 3 and 4. When the cell switching procedure is completed, cell B becomes the serving cell and the format for cell B of frames transmitted to cell B is shown by non-switch frame 2. The coded information carrying non-switch frame 2 is coded with the cover code of cell B, but now the first slot contains 4-bit C/I quantized information for cell B.

Figure 6:
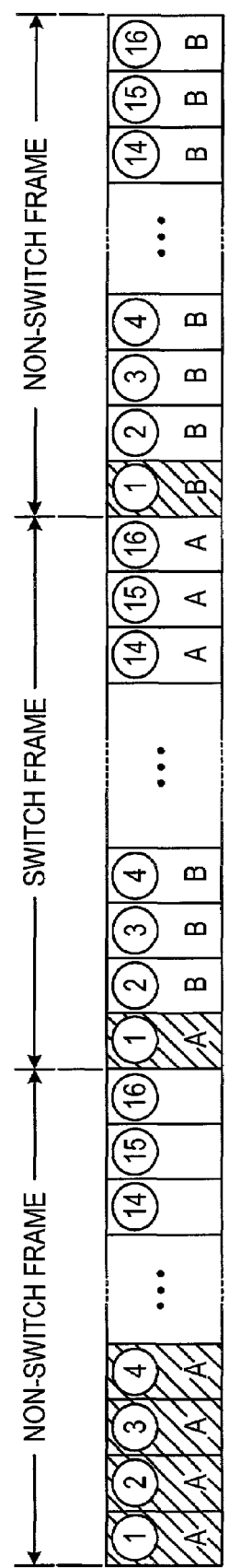
FIG. 6 depicts the format of non-switch frames and switch frames contained in information transmitted by a mobile switching from a cell A to a cell B in accordance with the method of the present invention.

Referring now to FIG. 6, there is shown yet another format of frames contained in a coded information transmitted by a mobile switching from cell A to cell B. In this third embodiment, non-switch frame 1 has the same format as non-switch frame 1 of FIGS. 4 and 5 except that it is not coded with a cover code of cell A. The first slot of switch frame 1 contains 4-bit C/I quantized information for cell A and slots 2, 3 and 4 contain a 4-bit code in which the first three bits identify any one of 6 cells (i.e., base stations) and the fourth bit is used for channel measurement adjustment information. Note that information of the slots in switch frame 1 is not coded with a spreading code that indicates the mobile's intent to switch from cell A to Cell B. The mobile's intent is determined from the information in slots 2, 3 and 4 that identify cell B as the target cell. Information in the slots of non-switch frame 2 is also not coded with the cover code of cell B.

In all of the embodiments described above, the serving cell as well as the target cell are able to determine the mobile's intent to switch cells from the coded information greatly facilitating the serving cell or target cell's ability to identify and confirm the initiation of switching procedure by a mobile. The system thus, operates more smoothly and more reliably because the processing needed to confirm that the initiation of cell switching and the identify of the target cell is greatly reduced.

In step 202 the base station receiving the null coded information has to confirm that indeed the received frame is a switching frame that identifies a target cell, i.e., the cell that the mobile equipment want to switch to. Since the null code automatically identifies the received frame as a switching frame, the waveforms carrying the switching frame information are only compared to 48 waveforms, i.e., $2^3 \cdot 5 + 8$. In other words, the base station first compares the received signal to all possible waveform having cover codes other than its own cover code for each of the 3 slots (i.e., slots 2, 3 and 4). Also the base confirms that there is no 1-bit channel measurement adjustment information in slots 2, 3 and 4 by comparing the received signal to all $1 \cdot 2^3$ or 8 possible waveforms. Therefore, instead of processing 208 waveforms as before, the method of the present invention allows the base station to process only 48 waveforms. If slots 2, 3 and 4 of the received frame is not null coded, the method of the present invention moves to step 110 where the received frame information is processed by the received base station in accordance with a protocol being followed by the communication system.

In step 204, when the receiving base station has confirmed that the received frame is a switching frame and the receiving base station is a serving base station the method of the present invention moves to step 206 where it transmits and acknowledgement signal to the transmitting mobile and the target base station allowing the switching procedure to be completed and thus allowing the mobile to switch cells. The serving base station may use additional criteria in deciding to send the acknowledgement signal to the mobile. Examples of such criteria include the serving base station's data outstanding for the mobile, and knowledge of the number of mobiles users in the serving and target base stations. When the receiving base station is a target base station, the method of the present invention moves to step 208 where the target base station completes the switching procedure with the mobile upon receipt of an acknowledgement signal from the serving base station, or repeated detection of the switch indication from the mobile. The switching procedure is completed as per the protocol being followed by the communication system.

For CDMA communication systems that do not comply with the 1x-EVDV standard as described above, a mobile transmits waveforms coded with a null code (i.e., a particularly defined Walsh code) and containing a block of information slots (e.g., switching frame) that indicates the mobile's desire to switch cells. In certain embodiment, the null code is able to be identified by at least the target system equipment and the serving system equipment. A portion of the block of information in the null coded waveform contains information that identifies a target system equipment (e.g., a target base station) and channel measurement update information. The format of the remainder of the block of information is not at all altered by the application of the method of the present invention.

Figure 3:
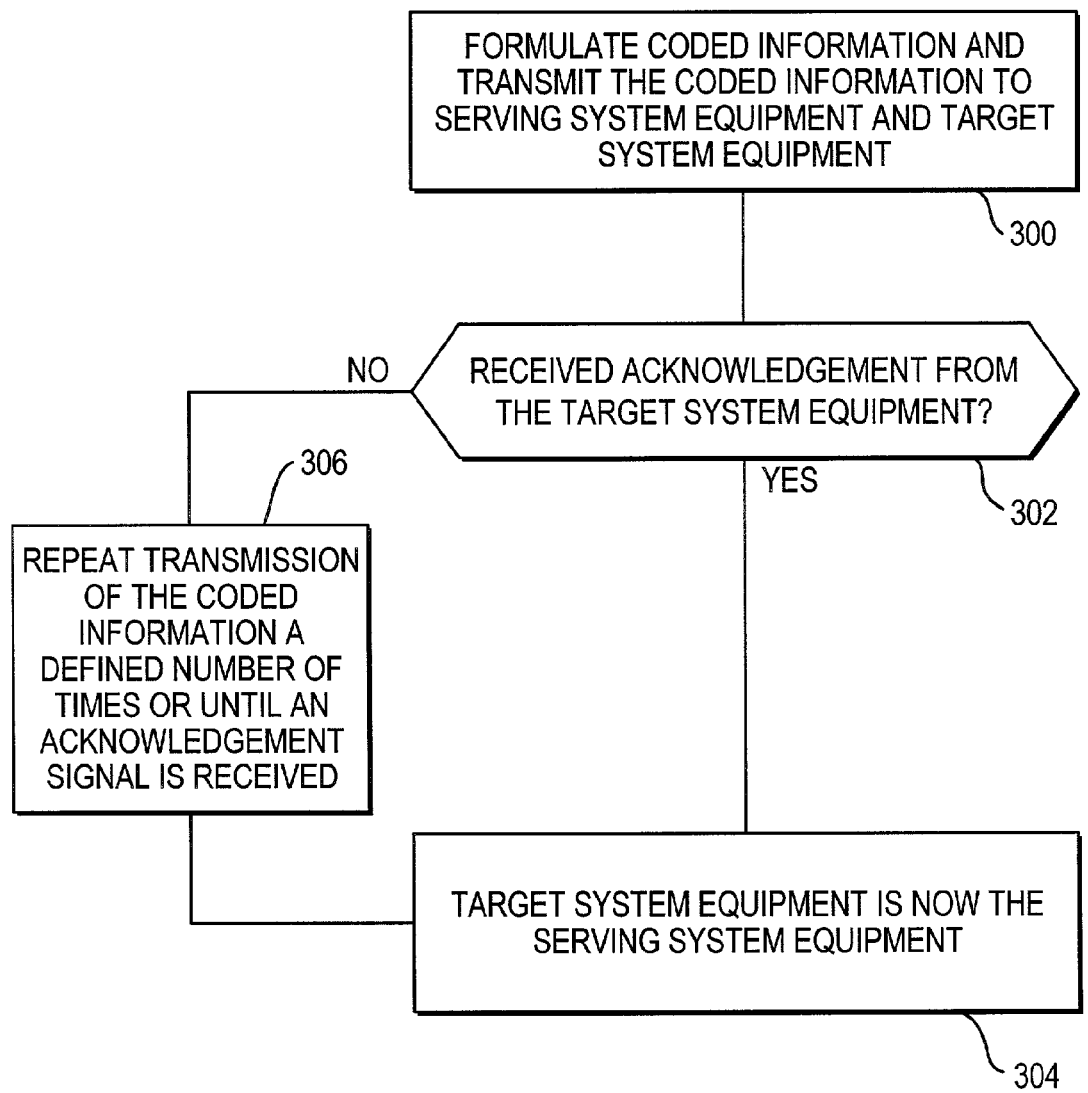
FIG. 3 depicts a flow chart of the method of the present invention as executed by a mobile equipment of the wireless communication system mentioned in FIG. 1.

Referring now to FIG. 3, there is shown the method of the present invention as executed by a mobile of the communication system. In step 300, the mobile decides to switch cells due any number of circumstances. For example, the C/I ratio of the serving base station may be fast becoming inadequate for proper operation. Also, the C/I ratio of one or more target base station may be currently quite adequate to serve the mobile. The mobile formulates a null coded waveform containing information about a target base station selected by the mobile based on any one of a plurality of criteria. For example, the mobile may not be receiving acceptable quality of service from the serving base station. The mobile formulates a null coded waveform by applying a spreading code (e.g., a null code) to one or more sinusoidal waveforms implemented as radio signals. The application of spreading code to the sinusoidal waveforms causes the waveforms to be combined or otherwise modulated in accordance with the value of the null code. The formulated null coded waveform containing information identifying a selected target base station information and update information for the current serving base station is transmitted by the mobile. Alternatively, the spreading code can be combined with the format information and the resulting block of information is applied to one or more sinusoidal wave forms thus combining and/or modulating the wave forms in accordance with the value of the resulting block of information.

In step 302, the mobile waits for an acknowledgement signal from the serving base station which acknowledgement serves to indicate to the mobile that it can proceed with a switching procedure with the selected target base station in accordance with a protocol being followed by the communication system. When the mobile receives the acknowledgement signal from the serving base station, the method of the present invention moves to step 304 in which the target base station completes the switching procedure and is now serving the mobile. If the mobile does not receive the acknowledgement signal within a defined period of time, the method of the present invention moves to step 306 where the mobile retransmits the null coded waveform a defined number of times. The method of the present invention then moves to step 304 after it has received an acknowledgement signal from the serving base station or after having transmitted the frame a certain defined number of times. The number of times is defined by the communication system and/or mobile.

We claim:

1. A method of cell switching by mobile equipment of a wireless communication system, the method comprising the step of:
    transmitting, by the mobile, coded information that indicate the mobile's intent to switch from its serving system equipment to a target system equipment identified by the coded information that contains channel measurement adjustment information for the serving system equipment, the coded information comprising a signal containing formatted information forming a frame divided into substantially equal slots with at least one slot containing information identifying the particular target system equipment, at least another slot containing C/I information for the serving system equipment and further slots containing channel measurement adjustment information for the serving system equipment.

2. The method of claim 1 where the information is transmitted over a reverse link signaling channel of a cell in which the system equipment is located.

3. The method of claim 1 further comprising the steps of:
    waiting for an acknowledgement signal from the serving system equipment; and
    completing the cell switching with the serving system equipment and the target system equipment.

4. The method of claim 1 where the coded information is a signal to which a spreading code is applied which signal contains formatted information having channel measurement adjustment information for the serving system equipment where either the spreading code or at least a portion of the formatted information identifies the particular target system equipment.

5. The method of claim 4 where the spreading code is a null code.

6. The method of claim 5 where the null code is a cover code defined by a 1x-EVDV CDMA system and where the formatted information is a 20 millisecond framed divided into 16 substantially equal time slots one of which contains C/I information of a forward channel of the serving system equipment, three of which contain information identifying the target system equipment and twelve of which contain channel measurement adjustment information for the serving system equipment.

7. The method of claim 4 where the spreading code is a cover code.

8. The method of claim 7 where the cover code identifies the target system equipment and the formatted information is a 20 millisecond frame divided into 16 substantially equal time slots 15 of which contain channel measurement adjustment information for the serving system equipment and one of which contains C/I information for the serving system equipment.

9. The method of claim 1 where the coded information is a signal containing formatted information that identify the particular target system equipment and said formatted information also contains channel measurement adjustment information for the serving system equipment.

10. The method of claim 9 where the formatted information is a 20 millisecond framed divided into 16 substantially equal slots three of which contain information identifying the target system equipment, one of which contains C/I information for the serving system equipment and 12 of which contain channel measurement adjustment information for the serving system equipment.

11. A method of cell switching in a wireless communication system, the method comprising:
    at a mobile equipment currently served by a serving system equipment, transmitting a switch frame comprising:
        coded information in at least one slot of the switch frame, the coded information identifying a particular target system equipment and indicating the mobile's intent to switch from the serving system equipment to the identified target system equipment, and
        channel measurement adjustment information for the serving system equipment in other slots of the switch frame.

12. The method of claim 11, wherein the coded information comprises a bit coded signal in the at least one slot of the switch frame that identifies the target system equipment.

13. The method of claim 12, wherein the bit coded signal is coded with a null code that indicates to receiving system equipment that the received frame is a switch frame and that the mobile equipment intends to switch cells.

14. The method of claim 12, wherein the bit coded signal indicates to receiving system equipment that the received frame is a switch frame and that the mobile equipment intends to switch cells.

15. The method of claim 11, wherein the coded information comprises a signal in the at least one slot of the switch frame, and wherein the signal is coded with a code that indicates to receiving system equipment that the received frame is a switch frame and that the mobile equipment intends to switch cells.

16. The method of claim 15, wherein the signal is coded with a null code that indicates to receiving system equipment that the received frame is a switch frame and that the mobile equipment intends to switch cells.

17. The method of claim 15, wherein the signal is coded with a cover code associated with the target serving equipment that indicates to receiving system equipment that the received frame is a switch frame and that the mobile equipment intends to switch to the target serving equipment.

18. A method of cell switching in a wireless communication system, the method comprising:
    at a mobile equipment currently served by a serving system equipment:
        transmitting non-switch frames to receiving system equipment, the non-switch frames including channel measurement adjustment information for the serving system equipment, and
        during a time period selected by the mobile equipment, transmitting a switch frame to the receiving system equipment, the switch frame comprising:
            channel measurement adjustment information for the serving system equipment, and coded information that identifies a particular target system equipment and indicates the mobile equipment's intent to switch from the serving system equipment to the target system equipment.

19. The method of claim 18, wherein the coded information comprises a bit coded signal in at least one slot of the switch frame that identifies the target system equipment.

20. The method of claim 18, wherein the coded information comprises a signal in at least one slot of the switch frame, the signal being coded with a code that indicates to receiving system equipment that the received frame is a switch frame and that the mobile equipment intends to switch cells.

* * * * *